US009249812B2

(12) United States Patent
Jeon et al.

(10) Patent No.: US 9,249,812 B2
(45) Date of Patent: Feb. 2, 2016

(54) HYDRAULIC CIRCUIT FOR PIPE LAYER

(75) Inventors: Man-Seuk Jeon, Changwon-si (KR); Han-Ok Choi, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 317 days.

(21) Appl. No.: 14/002,912

(22) PCT Filed: Mar. 7, 2011

(86) PCT No.: PCT/KR2011/001536

§ 371 (c)(1),
(2), (4) Date: Sep. 3, 2013

(87) PCT Pub. No.: WO2012/121427

PCT Pub. Date: Sep. 13, 2012

(65) Prior Publication Data

US 2013/0333367 A1 Dec. 19, 2013

(51) Int. Cl.

| | |
|---|---|
| ***F16D 31/02*** | (2006.01) |
| ***F15B 11/17*** | (2006.01) |
| ***F15B 11/16*** | (2006.01) |
| ***F15B 13/08*** | (2006.01) |
| ***E02F 9/22*** | (2006.01) |
| ***F15B 15/18*** | (2006.01) |
| ***E02F 5/10*** | (2006.01) |

(52) U.S. Cl.
CPC . *F15B 11/17* (2013.01); *E02F 5/10* (2013.01); *E02F 9/2232* (2013.01);
(Continued)

(58) Field of Classification Search
CPC ........ F15B 11/165; F15B 11/17; F15B 13/06; F15B 13/08
USPC .................................................... 60/421, 468
See application file for complete search history.

(56) References Cited

U.S. PATENT DOCUMENTS 5,680,759 A * 10/1997 Chung ................. B62D 11/183 60/421
5,692,377 A * 12/1997 Moriya ................. E02F 9/2242 60/421

(Continued)

FOREIGN PATENT DOCUMENTS

JP 05-132977 A 5/1993
JP 2010-030781 A 2/2010

(Continued)

OTHER PUBLICATIONS

International Search Report (in Korean and English) and Written Opinion (in Korean) for PCT/KR2011/001536, mailed Dec. 13, 2011; ISA/KR.

(Continued)

*Primary Examiner* — Michael Leslie
(74) *Attorney, Agent, or Firm* — Harness, Dickey & Pierce, P.L.C.

(57) ABSTRACT

Disclosed is a hydraulic circuit for a pipe layer, in which the generation of hydraulic shock in equipment is prevented when an operating device or a moving device is finely operated during combined work in a pipe-laying operation mode. The hydraulic circuit for a pipe layer according to the present invention comprises a main control valve having a straight traveling valve and controls a discharged flow of a hydraulic pump by a negative flow control system, wherein the hydraulic circuit comprises: an unloading valve which linearly controls the closing of a passage of a flow that flows to a hydraulic tank from a center bypass passage of a hydraulic pump when an operating device or a moving device is finely operated during combined work; a pilot valve which is linked with a straight traveling valve, and supplies signal pressure corresponding to an operation signal of the moving device or the operating device to the unloading valve; and an operation mode switch valve which is switched during the combined work, and respectively supplies pilot signal pressure to the straight traveling valve, the pilot valve, and a valve spool which is installed on a downstream side of the center bypass passage of the hydraulic pump.

4 Claims, 5 Drawing Sheets

(52) U.S. Cl.
CPC ............ *E02F 9/2242* (2013.01); *E02F 9/2267* (2013.01); *E02F 9/2282* (2013.01); *E02F 9/2285* (2013.01); *E02F 9/2292* (2013.01); *E02F 9/2296* (2013.01); *F15B 11/165* (2013.01); *F15B 13/08* (2013.01); *F15B 15/18* (2013.01); *F15B 2211/20553* (2013.01); *F15B 2211/20576* (2013.01); *F15B 2211/3116* (2013.01); *F15B 2211/329* (2013.01); *F15B 2211/50536* (2013.01)

(56) References Cited

U.S. PATENT DOCUMENTS 6,708,490 B2 * 3/2004 Toji ....................... E02F 9/2239 60/421
7,497,080 B2 * 3/2009 Ueda ..................... E02F 9/2242 60/421
8,146,355 B2 * 4/2012 Lee ...................... B62D 11/001 60/421
8,424,301 B2 * 4/2013 Choi ....................... B66C 23/44 60/421
2010/0018197 A1 1/2010 Yoo et al.
2013/0112291 A1 5/2013 Jeon

FOREIGN PATENT DOCUMENTS

KR 10-0225979 B1 10/1999
KR 10-2011-0007639 A 1/2011

OTHER PUBLICATIONS

International Preliminary Report on Patentability (Chapter II) (in Korean) for PCT/KR2011/001536, dated Oct. 18, 2012; IPEA/KR.

* cited by examiner

HYDRAULIC CIRCUIT FOR PIPE LAYER

FIELD OF THE INVENTION

The present invention relates to a hydraulic circuit for a pipe layer employing a negative flow control system. More particularly, the present invention relates to a hydraulic circuit for a pipe layer, in which when an actuator (or a boom cylinder, or the like) for work apparatus is finely manipulated in a pipe-laying operation mode (PL mode: a work mode in which a pipeline or the like is lifted and transported to a burial place), a hydraulic shock can be prevented from occurring.

BACKGROUND OF THE INVENTION

The above negative flow control system refers to a system in which when a pilot signal pressure generated from a pilot signal pressure-generating means installed at the downstream side of a center bypass path is high at the upstream side of the center bypass path, a discharge flow rate of a variable displacement hydraulic pump is controlled to be decreased whereas when the pilot signal pressure generated from a pilot signal pressure-generating means is low at the upstream side of the center bypass path, the discharge flow rate of the variable displacement hydraulic pump is controlled to be increased.

A conventional hydraulic circuit for a pipe layer in accordance with the prior art as shown in FIG. 1 includes:

first and second variable displacement hydraulic pumps (hereinafter, referred to as “first and second hydraulic pumps”) P1 and P2 and a pilot pump P3, which are configured to be connected to an engine 1;

one or more first control valves 3, 4 and 5 installed in a center bypass path (cbp) 2 of the first hydraulic pump P1 and configured to be shifted to control a flow direction and a flow rate of a hydraulic fluid that is supplied to a left traveling motor and a first work apparatus (or a swing motor, a winch motor, or the like);

one or more second control valves 7 and 8 installed in a center bypass path 6 of the second hydraulic pump P2 and configured to be shifted to control a flow direction and a flow rate of a hydraulic fluid that is supplied to a right traveling motor and a second work apparatus (or a boom cylinder or the like);

a straight traveling valve 9 installed at the upstream side of the center bypass path 6 of the second hydraulic pump P2, and configured to be shifted by a pilot signal pressure Pi from the pilot pump P3 to cause the hydraulic fluid discharged from the first hydraulic pump P1 to be distributed and supplied to the control valves 3 and 7 for the left and right traveling motors and to cause the hydraulic fluid discharged from the second hydraulic pump P2 to be distributed and supplied to the control valves 4, 5 and 8 for the first and second work apparatuses to thereby prevent one-way traveling when a combined operation mode for simultaneously driving the work apparatus and a traveling apparatus is selected;

an unloading valve 10 configured to be shifted by the pilot signal pressure that shifts the straight traveling valve 9 so that when the unloading valve is opened, the straight traveling valve 9 is shifted to prevent an overload from occurring in the center bypass paths 2 and 6 of the first and second hydraulic pumps P1 and P2;

one or more pilot valves 10 and 11 configured to release an unloading function of the unloading valve 10 when any one of the control valves 4, 5 and 8 for the work apparatuses and the control valves 3 and 7 for the traveling motors is driven in a shift mode in which the straight traveling valve 9 is shifted;

an operation mode switching valve 13 configured to be shifted in response to an electrical signal applied thereto from the outside when a combined operation mode for simultaneously driving the work apparatus and the traveling apparatus is selected to cause the pilot signal pressure from the pilot pump P3 to be supplied to the straight traveling valve 9 and the pilot valves 11 and 12, respectively; and a first shuttle valve 14 configured to control a swivel angle of a swash plate (a) of the first hydraulic pump P1 by a pressure selected from among a pilot signal pressure Pi1 supplied to the pilot valve 12 and a pressure at the downstream side of the center bypass path 2 of the first hydraulic pump P1, and a second shuttle valve 15 configured to control a swivel angle of a swash plate (b) of the second hydraulic pump P2 by a pressure selected from among a pilot signal pressure Pi2 supplied to the pilot valve 12 and a pressure at the downstream side of the center bypass path 6 of the second hydraulic pump P2.

In the drawings, a non-explained reference numeral 24 denotes cbp spools respectively installed at downstream sides of the center bypass paths 2 and 6, and a non-explained reference numeral 16 denotes a main control valve (MCV).

The operation of a hydraulic circuit for a pipe layer to which the negative flow control system as constructed above will be described hereinafter with reference to the accompanying drawings.

The hydraulic fluids discharged from the first hydraulic pump P1 and the second hydraulic pump P2 are dividedly supplied to the main control valve (MCV) 16 and the unloading valve 10 via the center bypass paths 2 and 6, respectively. The unloading valve 10 is not used in an excavation operation mode of the equipment, but is used when a pipe-laying operation (PL) mode signal is activated.

In the pipe-laying operation mode, when the operation mode switching valve 13 is shifted, the straight traveling valve 9 is shifted to a state shown in FIG. 1 by the pilot signal pressure supplied to a port Ts (referring to a signal pressure port formed at the main control valve 16 to shift the straight traveling valve 9) from the pilot pump P3

As a result, a part of the hydraulic fluid discharged from the first hydraulic pump P1 is supplied to the control valve 3 via the center bypass path 2 to drive the left traveling motor. At the same time, a part of the hydraulic fluid discharged from the first hydraulic pump P1 is supplied to the control valve 7 through the shifted straight traveling valve 9 via the center bypass path 2 and a flow path 25 to drive the right traveling motor.

On the other hand, a part of the hydraulic fluid discharged from the second hydraulic pump P2 is supplied to the control valves 4 and 5 via the center bypass path 6, the straight traveling valve 9, and the flow path 26 to drive the first work apparatus (or a swing motor or the like). At the same time, a part of the hydraulic fluid discharged from the second hydraulic pump P2 is supplied to the control valve 8 via the center bypass path 6 and the flow path 27 to drive the second work apparatus (or a boom cylinder or the like).

As described above, when the operation mode switching valve 13 manipulated by an operator during the pipe-laying operation, the straight traveling valve 9 is shifted by the pilot signal pressure supplied from the pilot pump P3 to cause the hydraulic fluid discharged from the first hydraulic pump P1 to be distributed and supplied to the left and right traveling motors and the hydraulic fluid discharged from the second hydraulic pump P2 to be distributed and supplied to the work apparatus (or a boom cylinder or the like).

Therefore, in the pipe-laying operation mode, when the work apparatus and the traveling apparatus are driven simultaneously, the traveling speed can be prevented from being changed abruptly due to a difference in a load occurring in the work apparatus or the traveling apparatus In the meantime, a signal pressure (40 kg/cm$^2$) is applied to the unloading valve 10 from the pilot valve 12 to open the unloading valve 10 by the signal pressure supplied to the pilot valve 12 through a signal line 17 connected to the port Ts. At the same time, the signal pressures of the outlet ports A1 and A2 of the pilot valve 12 are supplied to the ports Pi1 and Pi2 of the via the signal lines 18 and 19 after passing through the first and second shuttle valves 14 and 15 installed at the downstream side of the pilot valve 12, respectively. As a result, the swivel angles of the swash plates (a and b) of the first and second hydraulic pumps P1 and P2 is controlled by the regulators R1 and R2 to minimize the discharge flow rate of the first and second hydraulic pumps P1 and P2.

In addition, the hydraulic fluid of signal lines 20 and 21 discharged from the main control valve 16 is set to be introduced into the first and second shuttle valves 14 and 15 to minimize the discharge flow rate of the first and second hydraulic pumps P1 and P2.

This state is defined as a neutral state of the pipe-laying operation mode.

In this case, in the neutral state of the pipe-laying operation mode, when signals (i.e., a manipulation signal by an attachment control joystick and a manipulation signal by a travel control pedal) of attachment switching devices (for example, a hoist winch (HW), a swing (SW), a boom (BM) and a circuit in which the ports PS1 and PS2 are indicated) 30 and 40 is activated, the pilot valve 12 is shifted with Pi1 by the hydraulic fluid (having a pressure of 40 k/cm$^2$ or so) applied at the port PS2 (or PS1) of the attachment switching device 40. At the same time, the valve spools (or cbp spools) 24 of the main control valve 16 are shifted through the signal line 20.

When the valve spools 24 are shifted, respectively, the hydraulic fluid introduced into the main control valve 16 from the first hydraulic pump P1 and supplied to the hydraulic tank T, and the hydraulic fluid introduced into the main control valve 16 from the second hydraulic pump P2 and supplied to the hydraulic tank T are blocked, respectively.

When the pilot valve 12 is shifted, the hydraulic fluid of the port Ts is blocked at the pilot valve 12, and the hydraulic fluid of the port Pil disappears while flowing along a tank line 22 from the port A1 by the shifted pilot valve 12. In this case, the pressure applied to the first shuttle valve 14 at the downstream side of the port A1 also disappears simultaneously. As a result, when the pressure of the signal line 19 is reduced to cause the pressure of the port Pil of the first hydraulic pump P1 to be reduced to maximally control the discharge flow rate of the first hydraulic pump P1. At the same time, when the valve spools 24 of the main control valve 16 are shifted, the hydraulic fluid of a signal line 23 of the main control valve 16 is blocked and thus the pressure of the port Pil of the first hydraulic pump P1 is reduced via the first shuttle valve 14 to maximally control the discharge flow rate of the first hydraulic pump P1. At this time, the hydraulic fluid flowing to the hydraulic tank T from the port P1 of the unloading valve 10 is blocked.

On the other hand, when a signal of the attachment switching device (for example, BM or SW) 30 is activated, the attachment switching device 30 is connected to the Pi2 of the pilot valve 12 to shift the pilot valve 12 to the left on the drawing sheet. At this same time, the pressure of the port A2 of the pilot valve 12 and the pressure of the port Pil of the pilot valve 11 nearly disappear. The port A1 of the pilot valve 11 and the port Pil of the unloading valve 10 are connected to the tank line 22, and thus the pressures of the port A1 of the pilot valve 11 and the port Pil of the unloading valve 10 disappear.

In this case, the ports P2 and T of the unloading valve 10 are blocked. At the same time, the pressure of the port A2 of the pilot valve 12 disappears, and thus the pressure of the signal line disappears so that the discharge flow rate of the second hydraulic pump P2 is controlled to be discharged maximally. At this time, the maximally discharged hydraulic fluid is supplied to each attachment switching device.

In the meantime, the unloading valve 10 of a poppet type controls the flow rate of the hydraulic fluid in an ON/OFF manner by the pilot signal pressure applied from the outside. In other words, even if the pilot signal pressure of 1-40 kg/cm$^2$ is supplied to the ports Pi1 and Pi2 of the unloading valve 10, the flow rate is controlled in the ON/OFF manner. Therefore, when the unloading valve 10 is closed, a cross-sectional area of the closed aperture of a flow path is abruptly reduced to bring about a hydraulic shock (see FIG. 2(*a*)). As a result, it can be found that even if a low pilot signal pressure is applied to the unloading valve 10, the flow rate of the hydraulic fluid discharged from the first hydraulic pump P1 and the second hydraulic pump P2 is suddenly increased (see FIG. 2(*b*)).

As described above, when the attachment is finely manipulated by a pilot check type unloading system in the pipe-laying operation mode, the center bypass path is blocked by the poppet closing of the unloading valve. For this reason, the conventional the hydraulic circuit for a pipe layer entails a problem in that the discharge flow rate of the hydraulic pumps is controlled to the maximum in terms of the characteristics of the negative flow control system to cause the pressure to rise due to the excessive flow rate of the hydraulic fluid discharged from the hydraulic pump, leading to generation of chattering.

DETAILED DESCRIPTION OF THE INVENTION

Technical Problems

Accordingly, the present invention has been made to solve the aforementioned problem occurring in the prior art, and it is an object of the present invention to provide a hydraulic circuit for a pipe layer, in which when a work apparatus or a traveling apparatus is finely manipulated during a combined operation in a pipe-laying operation mode, hydraulic shock in equipment due to an excessive flow rate of a hydraulic fluid discharged from the hydraulic pump is prevented from occurring, thereby improving manipulability.

Technical Solution

To accomplish the above object, in accordance with an embodiment of the present invention, there is provided a hydraulic circuit for a pipe layer, in which a discharge flow rate of a hydraulic pump is controlled by a negative flow control system, the hydraulic circuit including:

first and second hydraulic pumps and a pilot pump, which are configured to be connected to an engine;

one or more first control valves installed in a center bypass path of the first hydraulic pump and configured to be shifted to control a flow direction and a flow rate of a hydraulic fluid that is supplied to a left traveling motor and a first work apparatus;

one or more second control valves installed in a center bypass path of the second hydraulic pump and configured to be shifted to control a flow direction and a flow rate of a hydraulic fluid that is supplied to a right traveling motor and a second work apparatus;

a straight traveling valve installed at the upstream side of the center bypass path of the second hydraulic pump, and configured to be shifted by a pilot signal pressure from the pilot pump to cause the hydraulic fluid discharged from the first hydraulic pump to be distributed and supplied to the control valves for the left and right traveling motors and to cause the hydraulic fluid discharged from the second hydraulic pump to be distributed and supplied to the control valves for the first and second work apparatuses when a combined operation mode for simultaneously driving the work apparatus and a traveling apparatus is selected;

a pair of unloading valves configured to linearly control the closing of a flow path extending from the center bypass paths of the first and second hydraulic pumps to a hydraulic tank when the work apparatus or the traveling apparatus is finely manipulated in a pipe-laying operation mode;

a pilot valve configured to be shifted by the pilot signal pressure for shifting the straight traveling value to cause a signal pressure that corresponds to a manipulation signal of the traveling apparatus to be supplied to the unloading valve to close the flow path extending from the center bypass path of the first hydraulic pump to the hydraulic tank and to cause a signal pressure that corresponds to a manipulation signal of the work apparatus to be supplied to the unloading valve to close the flow path extending from the center bypass path of the second hydraulic pump to the hydraulic tank; and an operation mode switching valve configured to be shifted in response to an electrical signal applied thereto from the outside when a combined operation mode for simultaneously driving the work apparatus and the traveling apparatus is selected to cause the pilot signal pressure from the pilot pump to be supplied to the straight traveling valve, the pilot valve, and valve spools installed at a downstream side of the center bypass paths of the first and second hydraulic pumps, respectively.

In accordance with a more preferable embodiment, each of the unloading valve may further include:

- a valve spool configured to be shifted by a pilot signal pressure from the outside to linearly control the cross-sectional area of the closed aperture of the flow path extending in fluid communication from the center bypass path of the first or second hydraulic pump to the hydraulic tank T; and
- a poppet 54 or 54*a* installed in a flow path between an outlet port of the valve spool and the hydraulic tank to open/close the flow path extending from the center bypass path of the first or second hydraulic pump to the hydraulic tank by a pressure formed in the center bypass path of the first or second hydraulic pump.
- In accordance with a more preferable embodiment, each of the unloading valves may further include a notch portion formed at the valve spool and configured to linearly control the closing of the flow path extending from the center bypass path of the first or second hydraulic pump to the hydraulic tank when an attachment is minutely operated in the pipe-laying operation mode.

In accordance with a more preferable embodiment, the hydraulic circuit for a pipe layer may further include:

- a first shuttle valve configured to control a swivel angle of a swash plate of the first hydraulic pump by a pressure selected from among a pilot signal pressure at the unloading valve side and a pressure at the downstream side of the center bypass path of the first hydraulic pump; and
- a second shuttle valve configured to control a swivel angle of a swash plate of the second hydraulic pump by a pressure selected from among a pilot signal pressure at the unloading valve and a pressure at the downstream side of the center bypass path of the second hydraulic pump.

Advantageous Effect

The hydraulic circuit for a pipe layer in accordance with an embodiment of the present invention as constructed above has the following advantages.

It is possible to prevent chattering and occurrence of hydraulic shock in equipment due to a pressure rise caused by an excessive flow rate of a hydraulic fluid discharged from the hydraulic pump when a work apparatus or a traveling apparatus is finely manipulated during a combined operation in a pipe-laying operation mode, thereby improving manipulability.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

Figure 1:
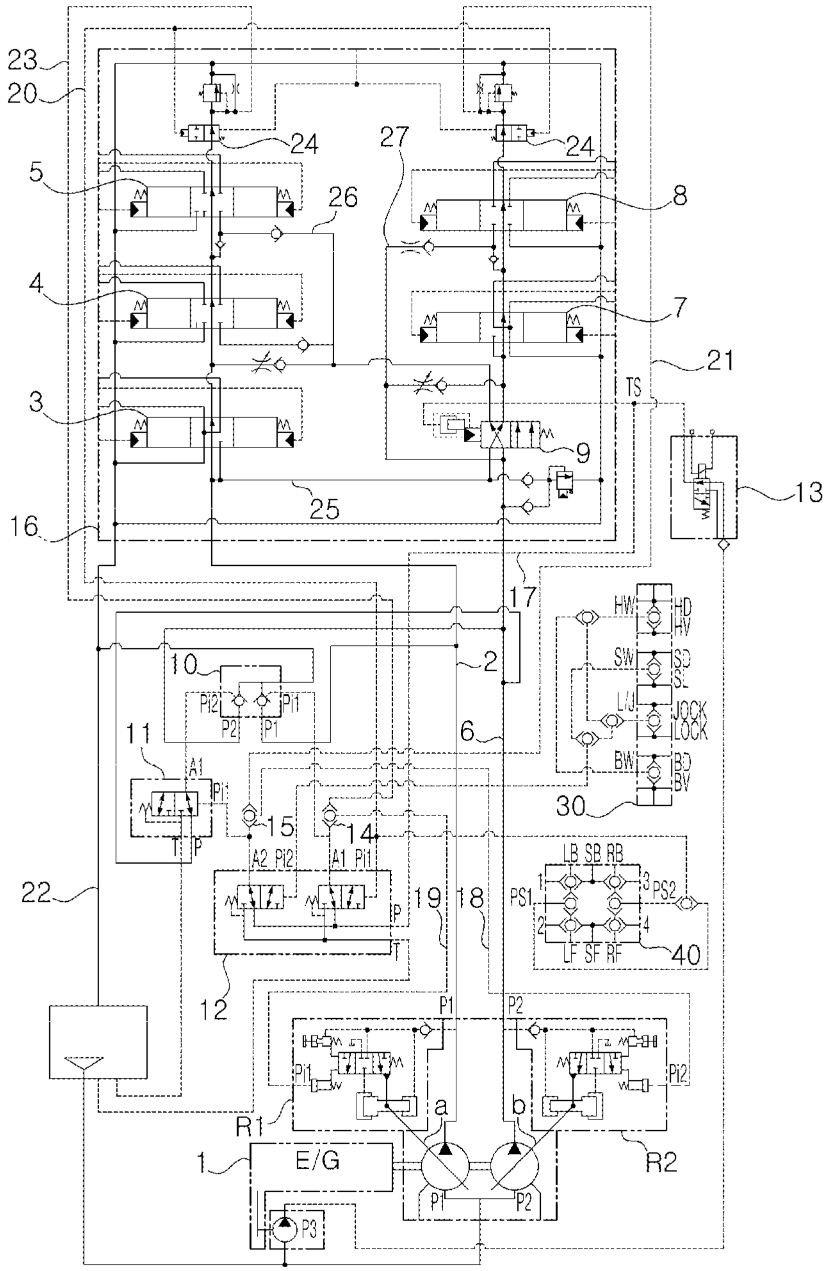
FIG. 1 is a circuit diagram showing a conventional hydraulic circuit for a pipe layer in accordance with the prior art.
Figure 2A:
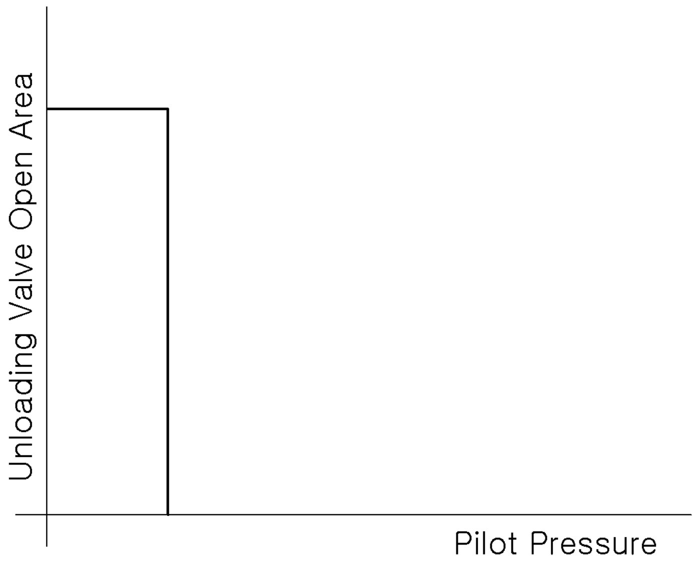
FIGS. 2(*a*) and 2(*b*) are graphs showing the operational characteristics of an unloading valve in a conventional hydraulic circuit for a pipe layer in accordance with the prior art.
Figure 2B:
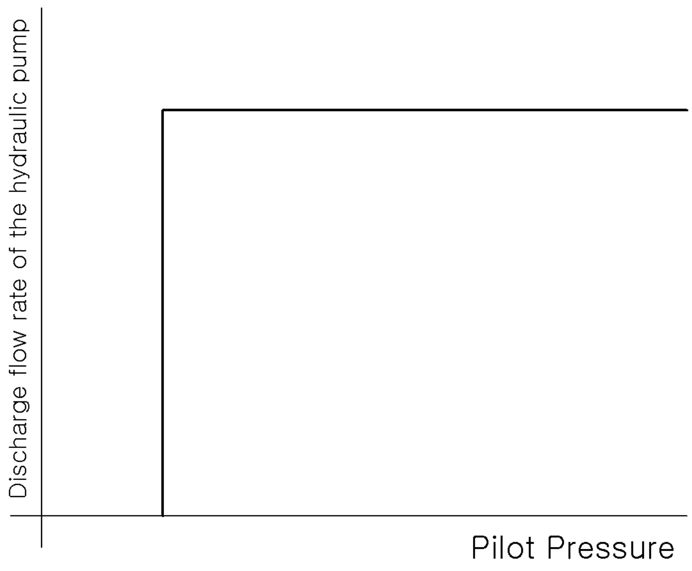

1: engine
3,5,7: control valve
9: straight traveling valve
13: operation mode switching valve
16: main control valve (MCV)
24: center bypass (cbp) spool
30,40: attachment switching device
50,50*a*: unloading valve
53,53*a*: valve spool
54,54*a*: poppet
55: notch portion
a,b: swash plate
P1: first hydraulic pump
P2: second hydraulic pump
P3: pilot pump

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 3:
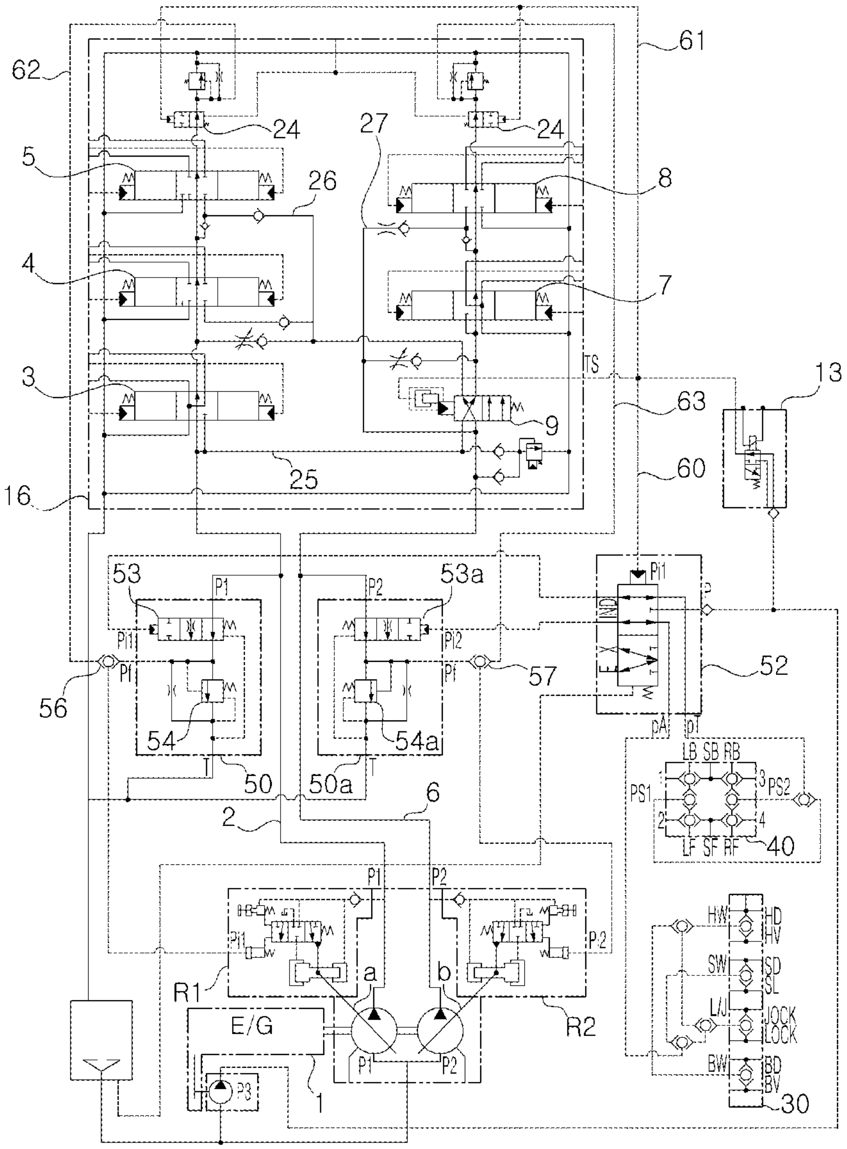
FIG. 3 is a circuit diagram showing a hydraulic circuit for a pipe layer in accordance with an embodiment of the present invention.
Figure 4:
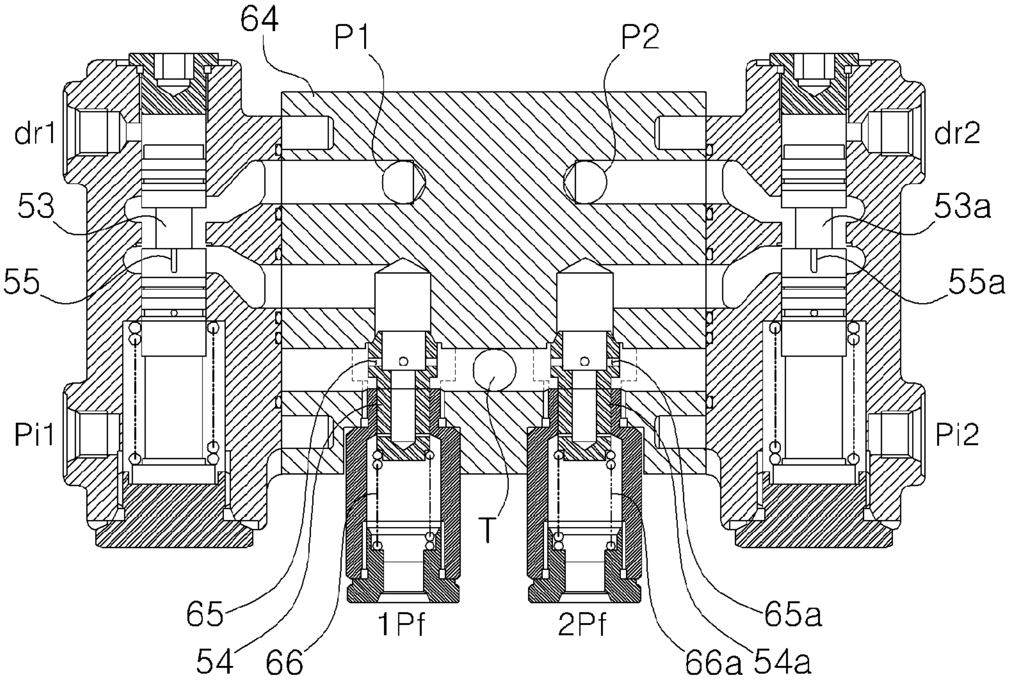
FIG. 4 is a cross-sectional view showing an unloading valve which is in a neural state in a hydraulic circuit for a pipe layer in accordance with an embodiment of the present invention.
Figure 5:
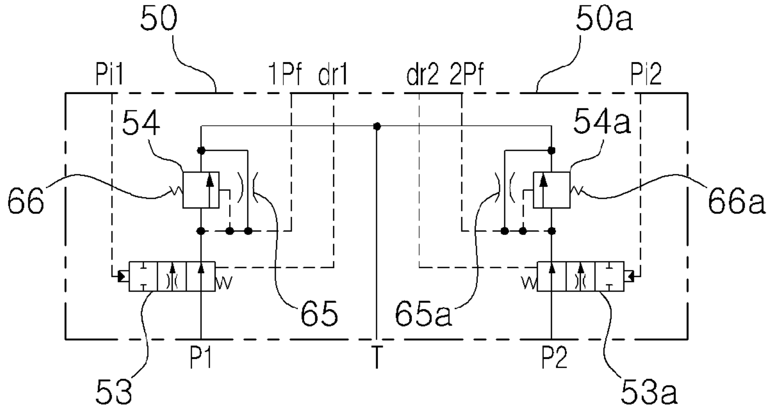
FIG. 5 is a circuit diagram showing an unloading valve in a hydraulic circuit for a pipe layer in accordance with an embodiment of the present invention.

A hydraulic circuit for a pipe layer, in which a discharge flow rate of a hydraulic pump is controlled by a negative flow control system in accordance with an embodiment of the present invention as shown in FIGS. 3 to 5 includes:

first and second variable displacement hydraulic pumps (hereinafter, referred to as "first and second hydraulic pumps") P1 and P2 and a pilot pump P3, which are configured to be connected to an engine 1;

a plurality of first control valves 3, 4 and 5 installed in a center bypass path 2 of the first hydraulic pump P1 and configured to be shifted to control a flow direction and a flow rate of a hydraulic fluid that is supplied to a left traveling motor and a first work apparatus (or a swing motor, a winch motor, or the like);

a plurality of second control valves 7 and 8 installed in a center bypass path 6 of the second hydraulic pump P2 and configured to be shifted to control a flow direction and a flow rate of a hydraulic fluid that is supplied to a right traveling motor and a second work apparatus (or a boom cylinder or the like);

a straight traveling valve 9 installed at the upstream side of the center bypass path 6 of the second hydraulic pump P2, and configured to be shifted by a pilot signal pressure from the pilot pump P3 to cause the hydraulic fluid discharged from the first hydraulic pump P1 to be distributed and supplied to the control valves 3 and 7 for the left and right traveling motors and to cause the hydraulic fluid discharged from the second hydraulic pump P2 to be distributed and supplied to the control valves 4, 5 and 8 for the first and second work apparatuses when a combined operation mode for simultaneously driving the work apparatus and a traveling apparatus is selected;

a pair of unloading valves 50 and 50*a* configured to linearly control the closing of a flow path extending from the center bypass paths 2 and 6 of the first and second hydraulic pumps P1 and P2 to a hydraulic tank when the work apparatus or the traveling apparatus is finely manipulated in a pipe-laying operation mode;

a pilot valve 52 configured to be shifted by the pilot signal pressure for shifting the straight traveling value to cause a signal pressure that corresponds to a manipulation signal of the traveling apparatus to be supplied to the unloading valve 50 to close the flow path extending from the center bypass path 2 of the first hydraulic pump P1 to the hydraulic tank and to cause a signal pressure that corresponds to a manipulation signal of the work apparatus to be supplied to the unloading valve 50*a* to close the flow path extending from the center bypass path 6 of the second hydraulic pump P2 to the hydraulic tank T; and an operation mode switching valve 13 configured to be shifted in response to an electrical signal applied thereto from the outside when a combined operation mode for simultaneously driving the work apparatus and the traveling apparatus is selected to cause the pilot signal pressure from the pilot pump P3 to be supplied to the straight traveling valve 9, the pilot valve 52, and valve spools (referring to the cbp spools) 24 installed at a downstream side of the center bypass paths 2 and 6 of the first and second hydraulic pumps P1 and P2, respectively.

In this case, the unloading valve 50 or 50*a* includes: a valve spool 53 or 53*a* configured to be shifted by a pilot signal pressure from the outside to linearly control the cross-sectional area of the closed aperture of the flow path extending in fluid communication from the center bypass path 2 or 6 of the first or second hydraulic pumps P1 or P2 to the hydraulic tank T; and a poppet (called "negative poppet") 54 or 54*a* installed in a flow path between an outlet port of the valve spool 53 or 53*a* and the hydraulic tank to open/close the flow path extending from the center bypass path 2 or 6 of the first or second hydraulic pump P1 or P2 to the hydraulic tank T by a pressure formed in the center bypass path 2 or 6 of the first and second hydraulic pump P1 or P2.

The unloading valve 50 or 50*a* further includes a notch portion 55 or 55*a* formed at the valve spool 53 or 53*a* and configured to linearly control the closing of the flow path extending from the center bypass path 2 or 6 of the first or second hydraulic pump P1 or P2 to the hydraulic tank T when an attachment is minutely operated in the pipe-laying operation mode.

The hydraulic circuit for a pipe layer further includes: a first shuttle valve 56 configured to allow a swivel angle of a swash plate a of the first hydraulic pump P1 to be controlled by a pressure selected from among a pilot signal pressure 1 pf at the unloading valve 50 side and a pressure at the downstream side of the center bypass path 2 of the first hydraulic pump P1; and a second shuttle valve 57 configured to allow a swivel angle of a swash plate of the second hydraulic pump P2 to be controlled by a pressure selected from among a pilot signal pressure 2 pf at the unloading valve 50*a* and a pressure at the downstream side of the center bypass path 6 of the second hydraulic pump P2.

Likewise, the configuration of the hydraulic circuit in which it includes the first and second hydraulic pumps P1 and P2 connected to the engine, the main control valve (MCV) 16, the operation mode switching valve 13, and attachment switching devices 30 and 40 is substantially the same as that of the hydraulic circuit shown in FIG. 1, and thus the detailed description of the configuration and operation thereof will be omitted avoid redundancy. The same elements are denoted by the same reference numerals.

Hereinafter, a use example of the hydraulic circuit for a pipe layer in accordance with an embodiment of the present invention will be described in detail with reference to the accompanying drawings.

As shown in FIGS. 3 to 6(*a*) and 6(*b*), when a pipe-laying operation mode is selected by an operator, the operation mode switching valve 13 is shifted to the top on the drawing sheet to cause a part of the pilot signal pressure discharged from the pilot pump P3 to be supplied to the straight traveling valve 9 through a port Ts of the main control valve 16 via the shifted operation mode switching valve 13 to shift a spool of the straight traveling valve 9 to the right on the drawing sheet (FIG. 3 shows a state in which the operation mode switching valve 13 and the spool of the straight traveling valve 9 have been shifted). Simultaneously, a part of the pilot signal pressure is supplied to the pilot valve 52 via a flow path 60 to cause a spool of the pilot valve 52 to be shifted to the bottom on the drawing sheet (FIG. 3 shows a state in which the spool of the pilot valve 52 has been shifted), and a part of the pilot signal pressure is supplied to the main control valve 16 via a flow path 61 to cause the valve spool (or cbp spool) 24 to be shifted to block the center bypass paths 2 and 6 of the first and second hydraulic pumps P1 and P2, respectively.

When the straight traveling valve 9 is shifted, a part of the hydraulic fluid discharged from the first hydraulic pump P1 is supplied to the control valve 3 through the center bypass path 2 to drive the left traveling motor. At the same time, a part of the hydraulic fluid discharged from the first hydraulic pump P1 is supplied to the control valve 7 through the straight traveling valve 9 via the flow path 25 to drive the right traveling motor.

On the other hand, a part of the hydraulic fluid discharged from the second hydraulic pump P2 is supplied to the control valves 4 and 5 through the straight traveling valve 9 via the center bypass path 6 and the flow path 26 to drive the swing motor and the winch motor. At the same time, a part of the hydraulic fluid discharged from the second hydraulic pump P2 is supplied to the control valve 8 via the center bypass path 6 and the flow path 27 to drive the boom cylinder. In this case, the hydraulic fluid discharged from the second hydraulic pump P2 hardly flows into the control valve 7.

The aforementioned first and second hydraulic pumps P1 and P2 causes an overload due to generation of high pressure in the center bypass paths 2 and 6 blocked by the shift of the spool 24. At this time, the pilot signal pressure from the pilot pump P3 is blocked at a point P of the pilot valve 52, and a manipulation signal Pi from the attachment switching device (30: a work apparatus manipulation signal, and 40: a traveling apparatus manipulation signal) is not supplied to the unloading valves 50 and 50*a* through the pilot valve 52.

For this reason, the unloading valves 50 and 50*a* are maintained in an opened state by a valve spring, and thus the hydraulic fluid discharged from the first and second hydraulic pumps P1 and P2 is supplied to the hydraulic tank T via the unloading valves 50 and 50*a* after passing through the center bypass paths 2 and 6 and ports P1 and P2 of the unloading valves 50 and 50*a*.

At the same time, higher pressures Pi1 and Pi2 selected from among a signal pressure outputted from the main control valve 16 and supplied to the first and second shuttle valves 56 and 57 through the flow paths 62 and 63, and a signal pressure Pf supplied to the first and second shuttle valves 56 and 57 at the unloading valves 50 and 50*a* are supplied to regulators R1 and R2 of the first and second hydraulic pumps P1 and P2, respectively. As a result, the swivel angels of the swash plates a and b of the first and second hydraulic pumps P1 and P2 are controlled, and thus a flow rate of the hydraulic fluid discharged from the first and second hydraulic pumps P1 and P2 is controlled to be minimized, thereby preventing occurrence of an overload.

In the meantime, in the case where a manipulation signal pressure (1-40 kg/cm$^2$) is applied through a port Ps2 (or a port Ps1) to correspond to a manipulation of the attachment switching device (40: traveling apparatus manipulation signal), it is supplied to a port Pi of the unloading valve 50 through the shifted pilot valve 52 to shift the spool of the unloading valve 50 to the right on the drawing sheet. Thus, the flow rate of the hydraulic fluid introduced into the unloading valve 50 from the center bypass path 2 of the first hydraulic pump P1 through the port P1 and supplied to the hydraulic tank T is gradually decreased.

As described above, a gradual decrease in a flow rate of the hydraulic fluid supplied to the hydraulic tank T from the from the center bypass path 2 of the first hydraulic pump P1 via the unloading valve 50 will be described hereinafter with reference to FIGS. 4 and 5.

As shown in FIG. 4, the hydraulic fluid discharged from the first hydraulic pump P1 is introduced into a port P1 of a valve block 64 through the port P1 of the unloading valve 50 fluidically communicating with the center bypass path 2. The introduced hydraulic fluid into the valve block 64 flows toward the hydraulic tank T while passing through the valve spool 53 and the orifice 65 of the poppet 54. At this time, the pressure of the hydraulic fluid discharged from the first hydraulic pump P1 rises, so that if the pressure of the hydraulic fluid is larger than an elastic force (or spring force) of a valve spring 66, the poppet 54 is shifted to the bottom on the drawing sheet to cause the hydraulic fluid discharged from the first hydraulic pump P1 to be supplied to the hydraulic tank T through the completely opened poppet 54.

In this case, the manipulation signal pressure (1-40 kg/cm$^2$) applied through a port Ps2 (or a port Ps1) to correspond to a manipulation of the attachment switching device (40: traveling apparatus manipulation signal) is supplied to the port Pi of the unloading valve 50 through the shifted pilot valve 52 to slowly shift the spool of the unloading valve 50 to the top on the drawing sheet. As a result, a flow path along which the hydraulic fluid passing through the port P1 of the valve block 64 flows toward the hydraulic tank T is closed gradually. In this case, a cross-sectional area of a closed aperture of the flow path of the unloading valve 50 is linearly controlled by the notch portion 55 formed at the valve spool 53. As a result, a flow rate of the hydraulic fluid introduced into the unloading valve 50 from the center bypass path 2 of the first hydraulic pump P1 through the port P1 and then flowing toward the hydraulic tank T is gradually decreased.

Figure 6A:
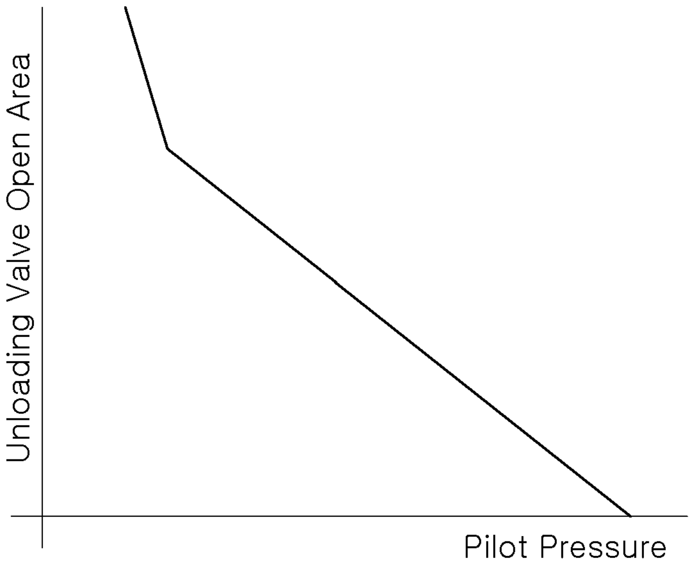
FIGS. 6(*a*) and 6(*b*) are graphs showing the operational characteristics of an unloading valve in a hydraulic circuit for a pipe layer in accordance with an embodiment of the present invention.
Figure 6B:
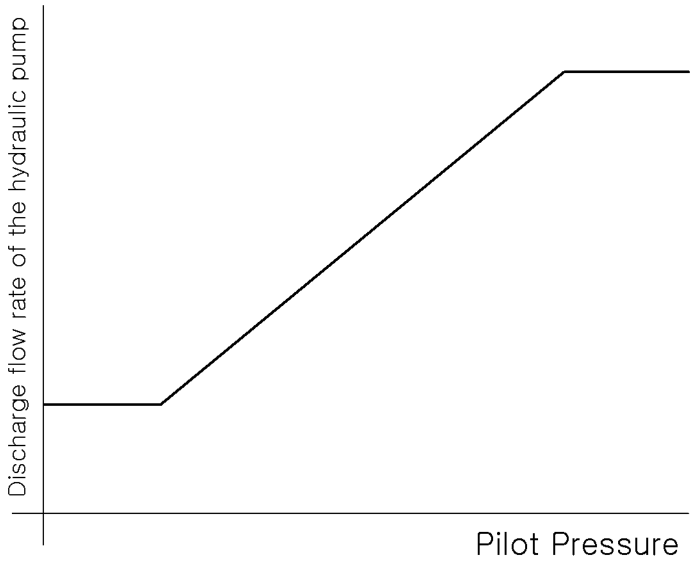

It can be found that the cross-sectional area of the closed aperture of the flow path of the unloading valve 50 is gradually decreased along with an increase in the pilot signal pressure Pi1 supplied to the unloading valve 50 (see FIG. 6(*a*)). Thus, it can be found that the flow rate of the hydraulic discharged from the first hydraulic pump P1 to correspond to the pilot signal pressure is linearly increased (see FIG. 6(*a*)).

In the meantime, the unloading valves 50 and 50*a* are formed in a left and right symmetrical structure shape and are operated in the same manner. For this reason, in the present specification, a description has been given of only the unloading valve 50 installed in the flow path fluidically communicating with the hydraulic tank T in the center bypass path 2 of the first hydraulic pump P1. Thus, the unloading valve 50*a* connected to the center bypass path 6 of the second hydraulic pump P2 has been omitted to avoid redundancy, and in the unloading valve 50*a*, all the elements which correspond to those of the unloading valve 50 are designated by the same reference numeral with a symbol "a" suffixed.

INDUSTRIAL APPLICABILITY

As described above, according to the hydraulic circuit for a pipe layer in accordance with an embodiment of the present invention, in the hydraulic circuit for a pipe layer to which a negative flow control system is applied, it is possible to prevent chattering and occurrence of hydraulic shock in equipment due to a pressure rise caused by an excessive flow rate of a hydraulic fluid discharged from the hydraulic pump when a work apparatus or a traveling apparatus is finely manipulated during a combined operation in a pipe-laying operation mode, thereby improving manipulability.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

The invention claimed is:

1. A hydraulic circuit for a pipe layer, in which a discharge flow rate of a hydraulic pump is controlled by a negative flow control system, the hydraulic circuit comprising:

first and second hydraulic pumps and a pilot pump, which are configured to be connected to an engine;

one or more first control valves installed in a center bypass path of the first hydraulic pump and configured to be shifted to control a flow direction and a flow rate of a hydraulic fluid that is supplied to a left traveling motor and a first work apparatus;

one or more second control valves installed in a center bypass path of the second hydraulic pump and configured to be shifted to control a flow direction and a flow rate of a hydraulic fluid that is supplied to a right traveling motor and a second work apparatus;

a straight traveling valve installed at the upstream side of the center bypass path of the second hydraulic pump, and configured to be shifted by a pilot signal pressure from the pilot pump to cause the hydraulic fluid discharged from the first hydraulic pump to be distributed and supplied to the control valves for the left and right traveling motors and to cause the hydraulic fluid discharged from the second hydraulic pump to be distributed and supplied to the control valves for the first and second work apparatuses when a combined operation mode for simultaneously driving the work apparatus and a traveling apparatus is selected;

a pair of unloading valves configured to linearly control the closing of a flow path extending from the center bypass paths of the first and second hydraulic pumps to a hydraulic tank when the work apparatus or the traveling apparatus is finely manipulated in a pipe-laying operation mode;

a pilot valve configured to be shifted by the pilot signal pressure for shifting the straight traveling valve to cause a signal pressure that corresponds to a manipulation signal of the traveling apparatus to be supplied to the unloading valve to close the flow path extending from the center bypass path of the first hydraulic pump to the hydraulic tank and to cause a signal pressure that corresponds to a manipulation signal of the work apparatus to be supplied to the unloading valve to close the flow path extending from the center bypass path of the second hydraulic pump to the hydraulic tank; and an operation mode switching valve configured to be shifted in response to an electrical signal applied thereto from the outside when a combined operation mode for simultaneously driving the work apparatus and the traveling apparatus is selected to cause the pilot signal pressure from the pilot pump to be supplied to the straight traveling valve, the pilot valve, and valve spools installed at a downstream side of the center bypass paths of the first and second hydraulic pumps, respectively.

2. The hydraulic circuit for a pipe layer according to claim 1, wherein each of the unloading valve comprises:

a valve spool configured to be shifted by a pilot signal pressure from the outside to linearly control the cross-sectional area of the closed aperture of the flow path extending in fluid communication from the center bypass path of the first or second hydraulic pump to the hydraulic tank; and a poppet installed in a flow path between an outlet port of the valve spool and the hydraulic tank to open/close the flow path extending from the center bypass path of the first or second hydraulic pump to the hydraulic tank by a pressure formed in the center bypass path of the first or second hydraulic pump.

3. The hydraulic circuit for a pipe layer according to claim 2, further comprising a notch portion formed at the valve spool and configured to linearly control the closing of the flow path extending from the center bypass path of the first or second hydraulic pump to the hydraulic tank when an attachment is minutely operated in the pipe-laying operation mode.

4. The hydraulic circuit for a pipe layer according to claim 1, further comprising:

a first shuttle valve configured to control a swivel angle of a swash plate of the first hydraulic pump by a pressure selected from among a pilot signal pressure at the unloading valve side and a pressure at the downstream side of the center bypass path of the first hydraulic pump; and a second shuttle valve configured to control a swivel angle of a swash plate of the second hydraulic pump by a pressure selected from among a pilot signal pressure at the unloading valve and a pressure at the downstream side of the center bypass path of the second hydraulic pump.

* * * * *